(12) United States Patent
Bartschies

(10) Patent No.: US 12,214,742 B2
(45) Date of Patent: Feb. 4, 2025

(54) DRIVE DEVICE HAVING A COUPLING DEVICE FOR A VEHICLE FLAP

(71) Applicant: Edscha Engineering GmbH, Remscheid (DE)

(72) Inventor: Christian Bartschies, Remscheid (DE)

(73) Assignee: Edscha Engineering GmbH, Remscheid (DE)

( * ) Notice: Subject to any disclaimer, the term of this patent is extended or adjusted under 35 U.S.C. 154(b) by 0 days.

(21) Appl. No.: 18/634,982

(22) Filed: Apr. 14, 2024

(65) Prior Publication Data

US 2024/0351553 A1 Oct. 24, 2024

(30) Foreign Application Priority Data

Apr. 19, 2023 (DE) ...................... 10 2023 109 932.9

(51) Int. Cl.
*B60R 21/38* (2011.01)
*B62D 25/12* (2006.01)

(52) U.S. Cl.
CPC .............. *B60R 21/38* (2013.01); *B62D 25/12* (2013.01)

(58) Field of Classification Search
CPC ................................ B62D 25/12; B62D 21/38
See application file for complete search history.

(56) References Cited

U.S. PATENT DOCUMENTS

| 11,590,926 | B2* | 2/2023 | Pfeifer | B60R 21/38 |
| 11,673,612 | B2* | 6/2023 | Sasaki | B62D 25/12 |
| | | | | 180/69.21 |
| 2015/0107930 | A1* | 4/2015 | Kugler | E05F 15/60 |
| | | | | 180/274 |
| 2022/0118939 | A1 | 4/2022 | Pfeifer et al. | |

FOREIGN PATENT DOCUMENTS

| DE | 102006042498 A1 | 3/2008 |
| DE | 102007009096 A1 | 8/2008 |
| DE | 102010027931 A1 | 5/2012 |
| DE | 102014014085 A | 2/2016 |
| DE | 102018125800 A1 | 4/2020 |

* cited by examiner

*Primary Examiner* — Faye M Fleming
(74) *Attorney, Agent, or Firm* — Davidson Kappel LLC

(57) ABSTRACT

A drive device for a pivotable vehicle flap includes a flap part associated with the vehicle flap, a body part associated with a vehicle body and a hinge arrangement which hingedly connects the flap part and the body part, the hinge arrangement allowing the flap part to be pivoted about a first axis of rotation for opening and closing the vehicle flap and about a second axis of rotation for raising the vehicle flap into a pedestrian protection position. The device drive also includes a first actuator for opening and closing the vehicle flap during normal operation, a second actuator for raising the vehicle flap into a pedestrian protection position and a coupling device for coupling the first actuator to one of the flap part and the vehicle flap. The coupling device includes a fastening part and a first coupling element coupled to the first actuator.

12 Claims, 6 Drawing Sheets

DRIVE DEVICE HAVING A COUPLING DEVICE FOR A VEHICLE FLAP

The present disclosure to a drive device for a vehicle flap, comprising a flap part associated with the vehicle flap, a body part associated with a vehicle body, a hinge arrangement hingedly connecting the flap part and the body part, a first actuator for opening and closing the vehicle flap during normal operation, a second actuator for raising the vehicle flap into the pedestrian protection position, and a coupling device for coupling the first actuator to one of the flap part and the vehicle flap.

BACKGROUND

In practice, drive devices for vehicle flaps are known which, during normal operation, enable a vehicle flap to open and close between a closed and an open position by means of a first actuator for maintenance of the vehicle or for loading or unloading luggage. Furthermore, it is known that the drive device can also be used for providing pedestrian protection and for this purpose comprises a second actuator which, in the event of a collision with a pedestrian, immediately moves the front flap into a raised pedestrian protection position in order to provide a deformation space in a region of the vehicle front. This prevents, in particular, the head of the pedestrian from striking, without slowing down, the hard engine block arranged beneath the front flap.

Because the vehicle flap is intended to be suddenly displaced in the event of a collision, the raising of the vehicle flap must under no circumstances be delayed or even blocked. In general, a particularly fast-acting second actuator is provided for driving the vehicle flap into this pedestrian protection position and is frequently designed as a pyrotechnic actuator. For the combination of such a fast-acting actuator with a first actuator which is intended for normal operation and for normal opening and closing of the front flap, it is problematic that, due to the coupling of the two separately provided actuators via the vehicle flap or via the vehicle body, a delay or even partial blocking of the raising movement of the drive device as a result of the first actuator may occur in a collision state.

DE 10 2018 125 800 A1 discloses a drive device for a raisable vehicle flap, comprising a first actuator hingedly connected between a vehicle flap and a vehicle body for moving the vehicle flap between a closed and open position of the vehicle flap and a second actuator for moving the vehicle flap into a raised pedestrian protection position. A first end of the first actuator is coupled to the vehicle flap via a coupling device. The coupling device comprises a fastening part which is fixedly connected to the vehicle flap and has an inner recess designed as an elongated hole in which a coupling element coupled to a first end of the first actuator is axially displaceable. When the second actuator is triggered, the coupling element is moved in the recess of the fastening part so that the second actuator does not have to completely follow the raising movement of the vehicle flap into the pedestrian protection position.

SUMMARY

An aim of the present disclosure is to provide a drive device which is designed to be reliable and compact, wherein the drive device provides both motor-driven opening and closing of the vehicle flap during normal operation and reliable raising of the vehicle flap into a pedestrian protection position.

According to one aspect of the present disclosure, a drive device for a raisable vehicle flap is provided, comprising a flap part associated with a vehicle flap, a body part associated with a vehicle body, and a hinge arrangement which hingedly connects the flap part and the body part, wherein the hinge arrangement allows the flap part to pivot about a first axis of rotation for opening and closing the vehicle flap and about at least a second axis of rotation for raising the vehicle flap into a pedestrian protection position. The drive device according to the present disclosure further comprises a first actuator for opening and closing the vehicle flap during normal operation, a second actuator for raising the vehicle flap into the pedestrian protection position, and a coupling device for coupling the first actuator to one of the flap part and the vehicle flap, wherein the coupling device comprises a fastening part which is fixedly connected to the one of the flap part and the vehicle flap and a coupling element coupled to the first actuator. The drive device according to the present disclosure is characterized in that the first coupling element can be moved from a locking position into a release position by moving in a translational manner relative to the fastening part, wherein, in the release position, the coupling element can rotate about a third axis of rotation relative to the fastening part.

During normal operation, the coupling device advantageously forms an overall rigid structure, which allows a defined movement of the vehicle flap between an open and closed position by means of the first actuator. Further advantageously, the connection between the coupling element and the fastening part in the release position is designed to be more flexible as a result of further degrees of freedom, so that, in the event of a pedestrian protection function being triggered, in which the second actuator must cause the vehicle flap to be raised very quickly, the first actuator is released relative to the vehicle flap or the flap part by means of the coupling device. Advantageously, the first actuator does not have to follow the very rapid movement of the vehicle flap or the flap part into the pedestrian protection position, and therefore neither an undesirable deflection of the first actuator occurs nor is the raising movement of the vehicle flap disadvantageously delayed by the first actuator.

The fastening part preferably comprises a holding device which locks the coupling element in the locking position in a rotationally fixed manner relative to the fastening part. The holding device preferably comprises at least a first holding element and a second holding element, which engage laterally around the coupling element in the locking position. Advantageously, by means of the translational movement of the coupling element relative to the fastening part, a rotational movement of the coupling element relative to the fastening part can be released in that the two holding elements no longer engage around the coupling element and thus a rotational movement about the third axis of rotation is released.

It is further preferably provided that a mechanical securing element secures the first coupling element in the locking position against a translational movement relative to the fastening part. Expediently, when the second actuator is actuated, the mechanical securing element is released by breaking a predetermined breaking point so that the coupling part can move in a translational manner relative to the fastening part. Advantageously, rapid decoupling of the coupling element and of the fastening part thus takes place so that a rapid transition of the coupling device or of the coupling element from the locking position into the release position can take place.

In a preferred embodiment, the coupling element has an inner recess for guiding the coupling element relative to the fastening part. The inner recess is preferably designed to extend longitudinally so that the coupling element is guided at least in a first portion of its translational movement. The inner recess is particularly preferably designed as an elongated hole. Further preferably, a bearing element which is fixedly arranged on the fastening part passes through the inner recess. Advantageously, the fastening part and the coupling element also remain coupled in the release position, but there are more degrees of freedom in the release position for the movement of the coupling element relative to the fastening part.

The bearing element is preferably arranged in the locking position at a first end of the inner recess and, in the release position, is arranged at a second end of the inner recess opposite the first end. Advantageously, the two opposite ends of the inner recess form well defined stop points for the bearing element, wherein, at least in the release position, in addition to a possibility of rotating the coupling element around the bearing element, a translational movement between the first end of the inner recess and the second end of the inner recess is also possible. Particularly preferably, the bearing element forms the third axis of rotation about which the coupling element is rotatable.

Further advantages, features, and developments of the claimed present disclosure emerge from the following description of a preferred embodiment and from the dependent claims.

BRIEF SUMMARY OF THE DRAWINGS

The present disclosure is explained in more detail below with reference to the accompanying drawings.

DETAILED DESCRIPTION

Figure 1:
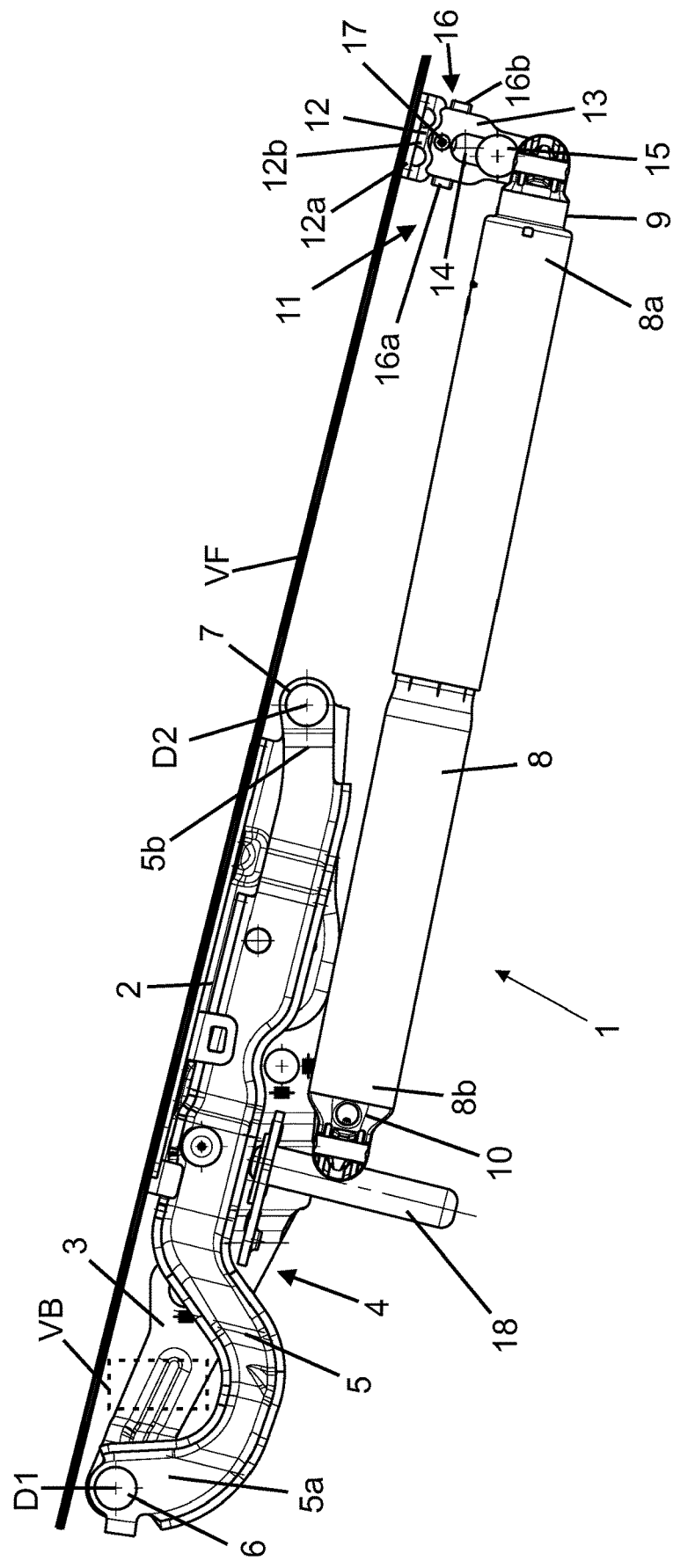
FIG. 1 is a side view of an embodiment of a drive device in a closed normal state of the vehicle flap.

FIG. 1 shows an embodiment of a drive device 1 in a side view. The drive device 1 comprises a flap part 2 which is fixedly connected to a vehicle flap VF and a body part 3 which can be fixed to a vehicle body VB, wherein the flap part 2 is pivotable together with the vehicle flap VF relative to the body part 3 or the vehicle body VB. For this purpose, a hinge arrangement 4 is provided between the flap part 2 and the body part 3, which hinge arrangement hingedly connects the flap part 2 and the body part 3 to one another.

The hinge arrangement 4 comprises a link 5 which is connected to the body part 3 by a first end 5a via a first single hinge 6 rotatably about a first axis of rotation D1. The flap part 2 in turn is connected to a second end 5b of the link 5 via a second single hinge 7 rotatably about a second axis of rotation D2. Advantageously, the flap part 2 can be pivoted together with the vehicle flap VF via the first single hinge 6 about the first axis of rotation D1 between the closed position shown here and an open position of the vehicle flap VF provided, for example, for maintenance purposes. However, the hinge arrangement 4 also makes it possible for the vehicle flap VF to be pivoted into a pedestrian protection position by rotating the flap part 2 about the second axis of rotation D2.

The drive device 1 further comprises a first actuator 8, which in the present embodiment is designed as a spindle drive and can accordingly be adjusted in length by a motor. A first connection element 9, which is designed as a ball socket, is connected to a first end 8a of the first actuator 8. The first connection element 9 serves to connect the first actuator 8 to the flap part 2 or the vehicle flap VF. A second connection element 10, which is also designed as a ball socket, is provided at a second end 8b of the first actuator 8 opposite the first end 8a. The second connection element 10 serves to connect the first actuator 8 to the body part 3. The first end 8a of the first actuator 8 is hingedly connected via the first connection element 9 to a coupling device 11 which is arranged between the vehicle flap VF and the first actuator 8.

The coupling device 11 comprises a fastening part 12 which is fixedly arranged on the vehicle flap VF in the embodiment shown here. The fastening part 12 has a fastening portion 12a which is provided for fastening the coupling device 11 to the vehicle flap VF or alternatively also to the flap part 2. The fastening part 12 further comprises a coupling portion 12b which extends vertically downward relative to the fastening portion 12a and is provided for coupling to the first actuator 8.

The coupling device 11 comprises a coupling element 13 which is hingedly coupled to the first connection element 9 or to the first end 8a of the first actuator 8. The coupling element 13 is designed as a sheet metal part and has an elongated shape. The coupling element 13 has an inner recess 14, through which a bearing element 15 fixedly arranged on the fastening part 12 passes. Via the inner recess 14, the coupling element 13 can be moved in a translational manner relative to the fastening part 12 from the locking position shown here into a release position. In the locking position shown here, a first holding element 16a and a second holding element 16b, which are molded on the fastening part, laterally engage around the coupling element 13. The first holding element 16a and the second holding element 16b form a holding device 16 which, in the locking position, prevents the coupling element 13 from rotating around the bearing element 15.

In the state shown in FIG. 1, in which the vehicle flap VF is closed during normal operation, the first coupling element 13 is secured via a securing element 17 against a translational movement relative to the fastening part 12. In the present embodiment, the securing element 17 is designed as a shear rivet and connects the first coupling element 13 to the fastening part 12.

In the locking position of the coupling element 13 shown here, the coupling device 11 is, as a whole, immovable relative to the vehicle flap VF or the flap part 2 as a result of the securing element 17 so that the flap part 2 or the vehicle flap VF can be moved between a closed position and an open position in a defined manner by the first actuator 8 during normal operation.

The drive device 1 further comprises a second actuator 18 which is fixedly connected to the body part 3 and is provided for driving a raising movement of the flap part 2 relative to the body part 3 into a pedestrian protection position. The second actuator 18 is designed as a pyrotechnic actuator so that it can advantageously drive a raising movement into the pedestrian protection position particularly quickly. In the state of the drive device 1 shown here during normal operation, the second actuator 18 is inactive.

Figure 2:
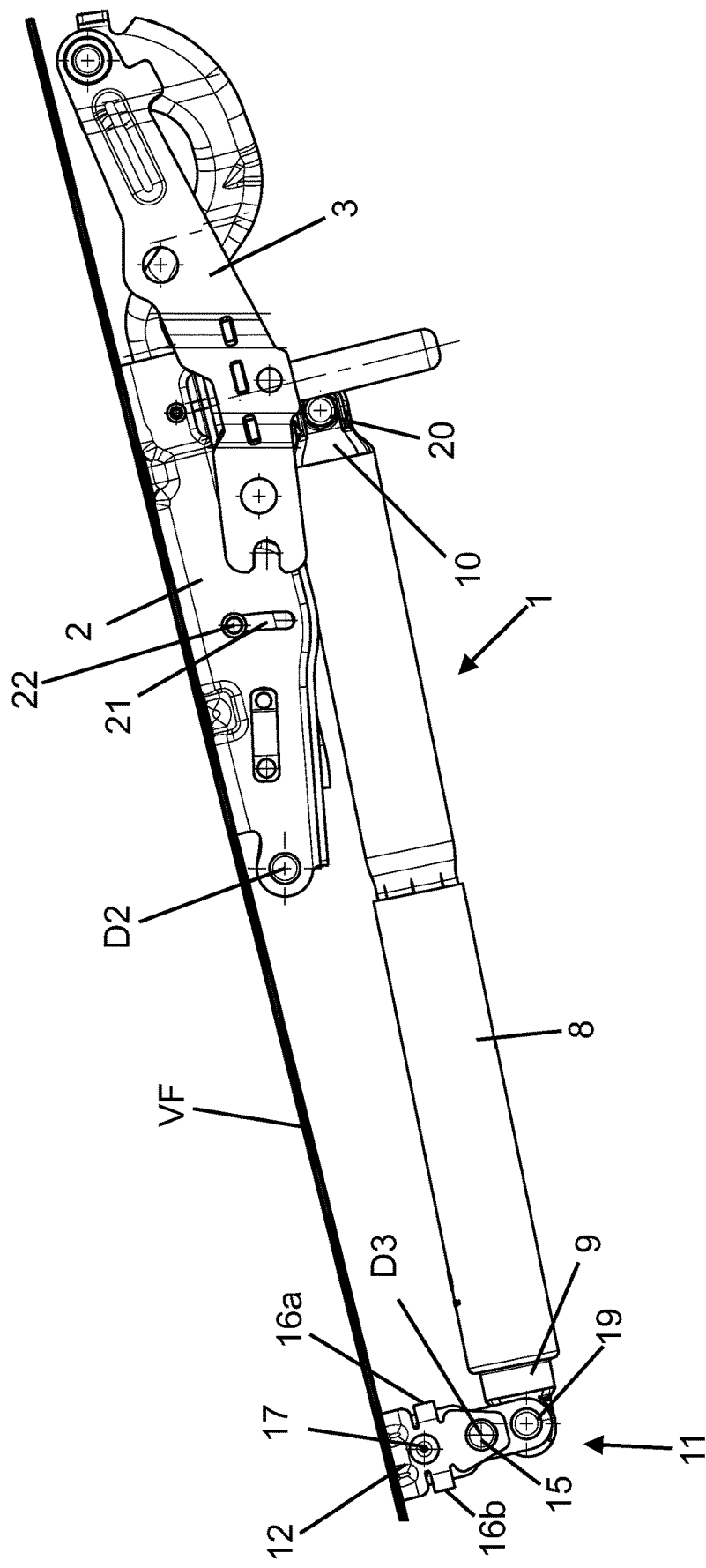
FIG. 2 is a rear view of the drive device from FIG. 1.

FIG. 2 shows the drive device 1 from FIG. 1 in a rear view. In this view, the rear side of the coupling device 11 can also be seen. The rear side of a first ball pin 19, which is fixedly connected to the first coupling element 13 and is in hinged engagement with the first connection element 9 designed as a ball socket, can be seen. Furthermore, the rear side of a second ball pin 20, which is in hinged engagement with the second connection element 10 designed as a ball socket, can be seen. The first actuator 8 is advantageously hingedly connected between the flap part 2 or the vehicle flap VF and the body part 3.

Since the coupling element 13 of the coupling device 11 is secured against a downward translational movement relative to the fastening part 12 or the flap part 2 as a result of the securing element 17, which passes through the fastening part 12 and the first coupling element 13, the first ball pin 19 is also spatially fixed relative to the vehicle flap VF or the flap part 2 so that a movement of the flap part 2 or of the vehicle flap VF can be driven in a defined manner by extending the first actuator 8. Furthermore, a rotational movement of the coupling element 13 about a third axis of rotation D3 formed by the bearing element 15 is prevented, since the holding elements 16a, 16b are in engagement with the coupling element 13 at a distance from the third axis of rotation D3.

It can also be seen in FIG. 2 that the flap part 2 has a narrow recess 21, through which a stop pin 22 fixedly arranged on the link 5 passes. This advantageously limits a raising movement or pivoting movement of the flap part 2 about the second axis of rotation D2. In addition, the recess 21 forms a guide contour for the stop pin 22.

Figure 3:
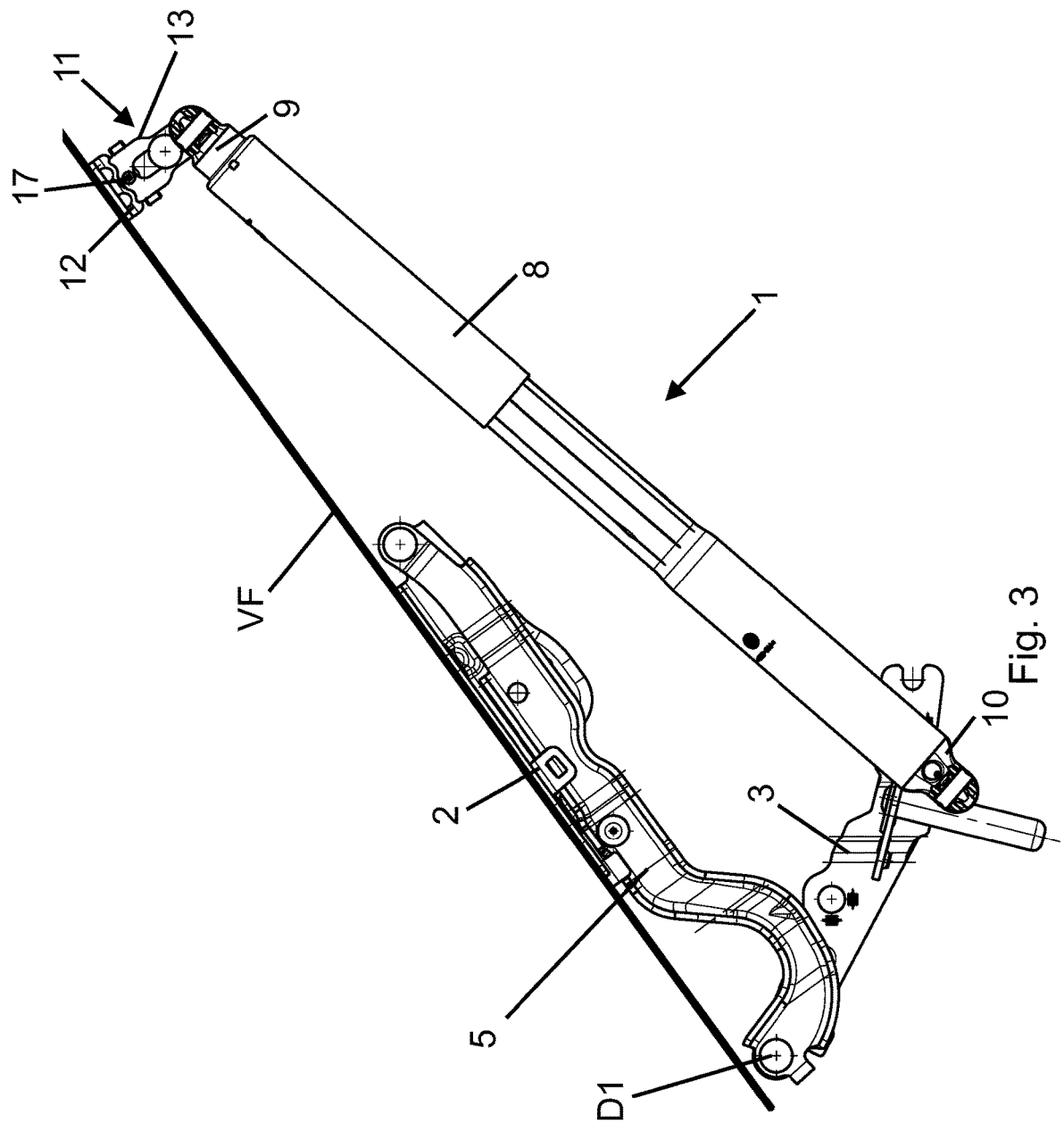
FIG. 3 is a side view of the drive device from FIG. 1 in an open normal state.

FIG. 3 shows the drive device 1 in a side view when the vehicle flap VF is open. As a result of the motor-driven extension of the first actuator 8, the link 5 together with the flap part 2 and the vehicle flap VF were rotated about the first axis of rotation D1 relative to the body part 3 so that the interior of the vehicle covered by the vehicle flap VF is now exposed. Since the first actuator 8 is hingedly connected to the coupling device 11 via the first connection element 9 and is hingedly connected to the body part 3 via the second connection element 10, the linear force generated by the extension of the first actuator 8 was converted into a pivoting movement of the flap part 2 or of the vehicle flap VF.

As a result of the connections between the coupling element 13 and the fastening part 12 that still exist through the securing element 17, the coupling device 11 is in the same state as when the flap is closed (cf. FIG. 1 and FIG. 2), i.e., the coupling element 13 remains fixedly connected to the fastening part 12.

Figure 4:
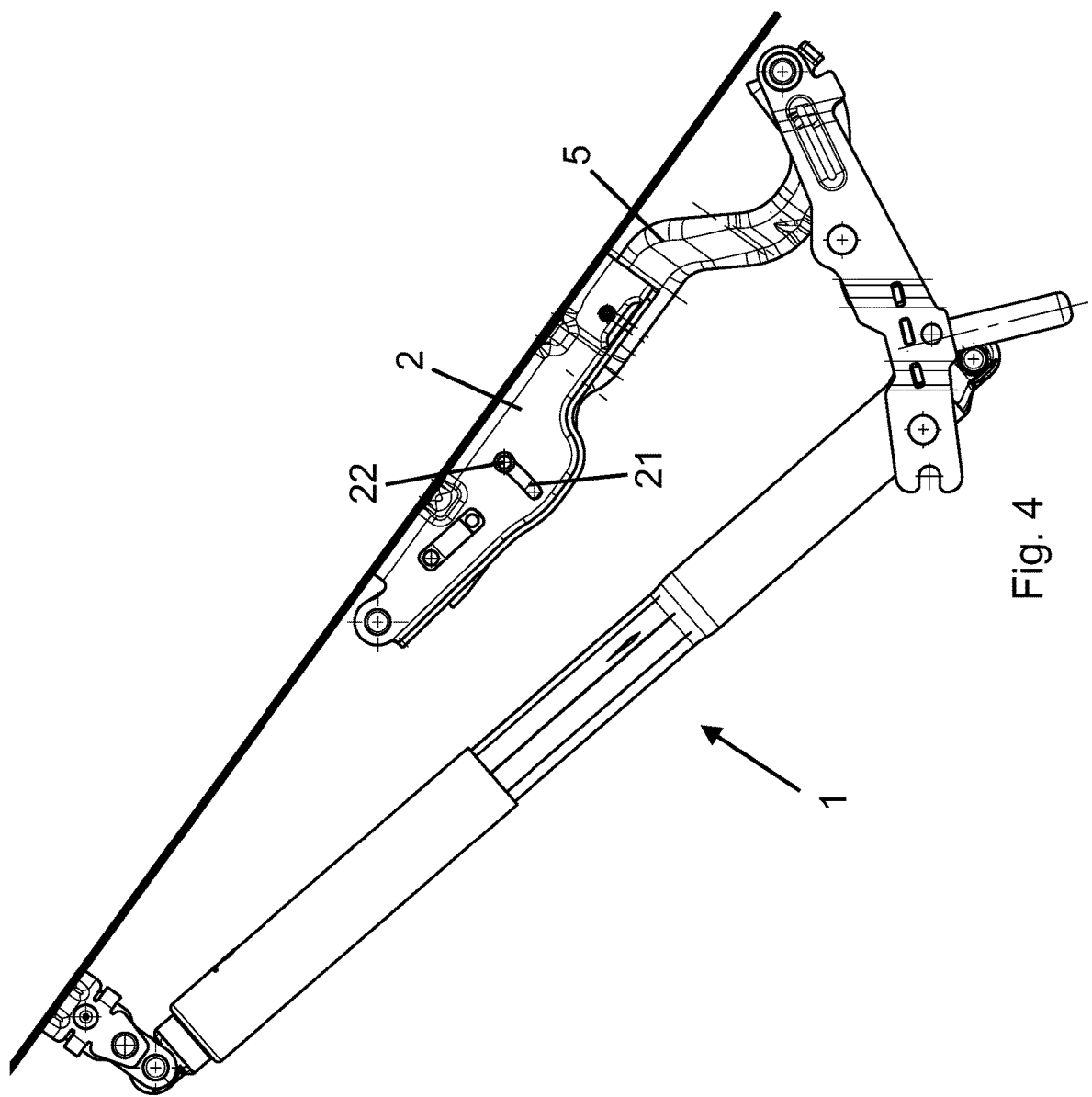
FIG. 4 is a rear view of the drive device from FIG. 3.

FIG. 4 shows the drive device 1 from FIG. 3 in a rear view. In this view, it can be seen that the flap part 2 is still in the non-raised state relative to the link 5. Accordingly, the stop pin 22 is still in an upper end position in the recess 21.

Figure 5:
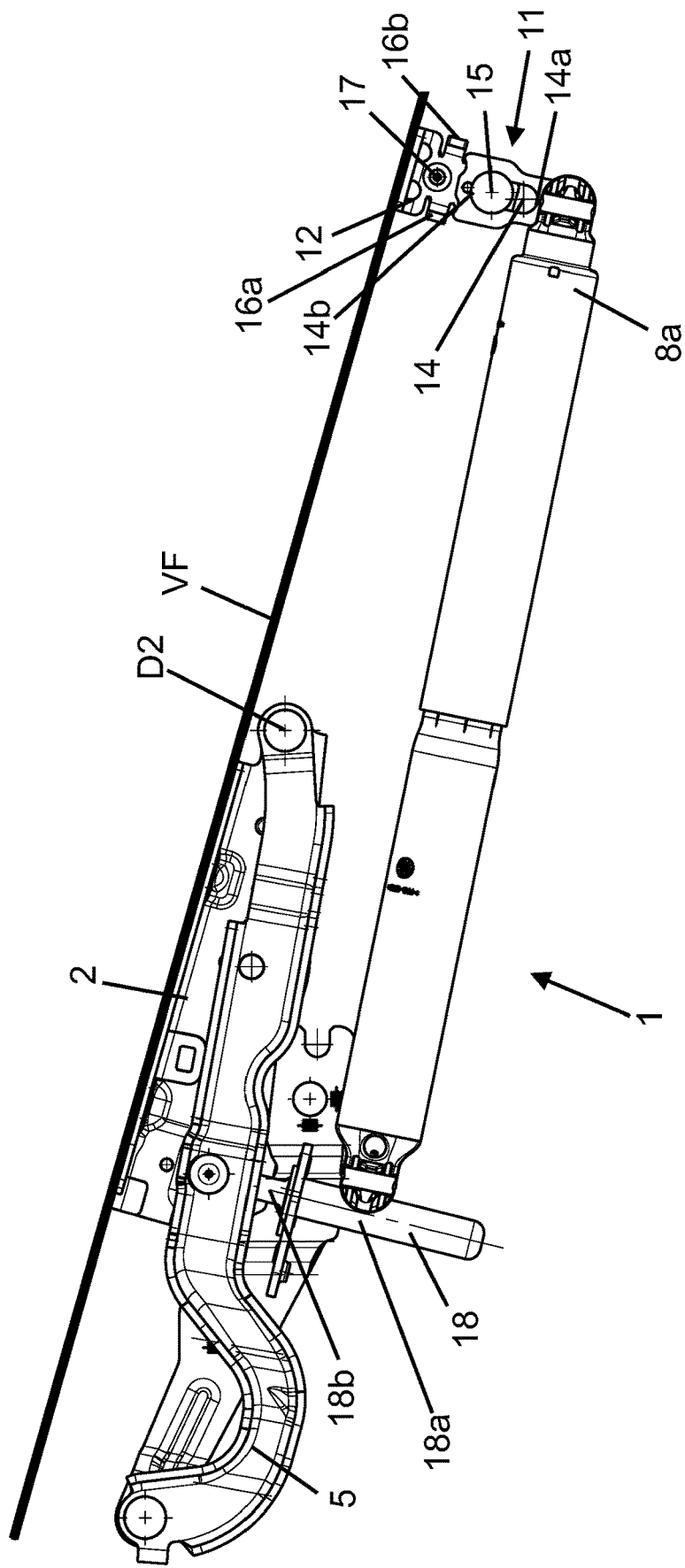
FIG. 5 is a side view of the drive device in a raised pedestrian protection position.

FIG. 5 is a side view of the drive device 1 with the vehicle flap VF in a partially raised pedestrian protection position. The second actuator 18 was triggered by a detected collision with a pedestrian, wherein a piston 18b that can be extended from a main housing 18a of the second actuator 18 has been partially extended. The piston 18b abuts an underside of the flap part 2, and the flap part 2 was thereby rotated about the second axis of rotation D2 relative to the link 5.

The force suddenly occurring perpendicularly to a longitudinal extension of the vehicle flap VF was transmitted to the fastening part 12 of the coupling device 11, as a result of which the securing element 17 was sheared off or destroyed and thus the first coupling element 13 was moved downward in a translational manner relative to the fastening part 12, wherein the coupling element 13 is now no longer engaged around by the holding elements 16a, 16b, and thus a rotation about the third axis of rotation D3 is also possible.

Advantageously, by means of the translational movement and the associated release of the rotational movement of the coupling element 13, the release of the first end 8a of the first actuator 8 relative to the vehicle flap VF or the flap part 2 is generated so that the first actuator 8 does not have to follow the rapid raising movement of the vehicle flap VF nor is the raising movement of the vehicle flap VF delayed by the first actuator 8. Therefore, the coupling element 13 is in the release position, in which the first end 8a of the first actuator is rotatable relative to the fastening part 12 or the vehicle flap VF about the third axis of rotation D3 formed by the bearing element 15, and a translational movement along the longitudinal extension of the inner recess 14 designed as an elongated hole is also possible. In the locking position, the bearing element 15 is located in the region of a first end 14a of the inner recess 14 and, in the release position of the coupling element 13 shown here, is located at a second end 14b of the inner recess 14 opposite the first end 14a. It is thereby possible to avoid a forced change in length of the first actuator 8 more effectively, since the first end 8a can move more freely relative to the vehicle flap VF or the flap part 2.

Figure 6:
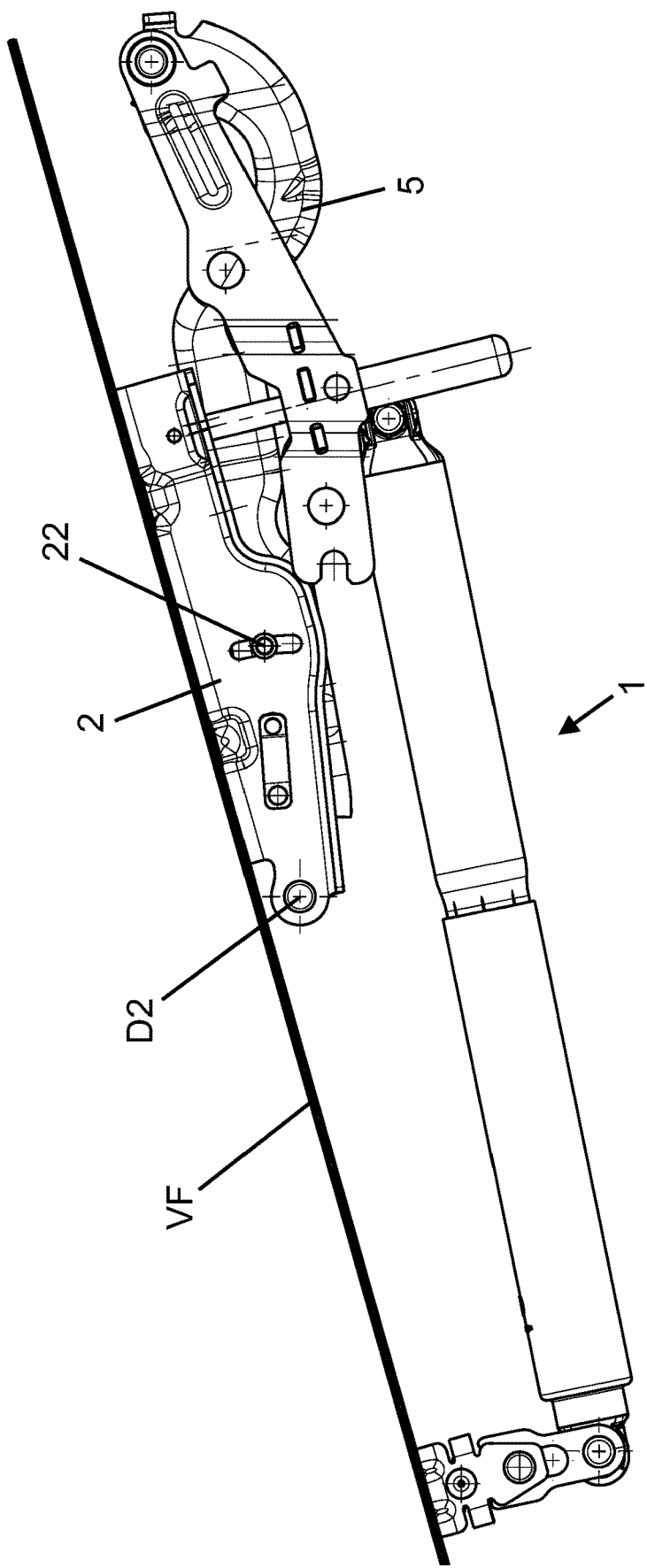
FIG. 6 is a rear view of the drive device from FIG. 5.

FIG. 6 is a rear view of the drive device 1 from FIG. 5. It can be seen here that the stop pin 22 has now been moved into a central position in the recess 22 by the rotation of the flap part 2 relative to the link 5 about the second axis of rotation D2. Advantageously, the raising movement of the flap part 2 or of the vehicle flap VF is effectively limited or it is ensured that a predefined raising height is not exceeded. Furthermore, it can be seen that the angle of the first actuator relative to the body part 3 has not changed, since the coupling element 13 is in the release position.

The present disclosure has been explained above with reference to one embodiment in which the first actuator 8 is designed as a spindle drive. It goes without saying that the first actuator can also be designed as a different linearly acting actuator, such as a hydraulically operated drive or the like. It is only essential for the present disclosure that the coupling device is designed to be compact and effectively prevents virtually no forces from acting on the first actuator during a raising movement of the vehicle flap into a pedestrian protection position driven by a second actuator, since the coupling device allows the first actuator to remain in its usual position during normal operation.

What is claimed is:

1. A drive device for a pivotable vehicle flap comprising:
a flap part associated with the vehicle flap;
a body part associated with a vehicle body;
a hinge arrangement which hingedly connects the flap part and the body part, the hinge arrangement allowing the flap part to be pivoted about a first axis of rotation for opening and closing the vehicle flap and about a second axis of rotation for raising the vehicle flap into a pedestrian protection position;
a first actuator for opening and closing the vehicle flap during normal operation;
a second actuator for raising the vehicle flap into the pedestrian protection position; and
a coupling device for coupling the first actuator to one of the flap part and the vehicle flap, comprising a fastening part which is fixedly connected to the one of the flap part and the vehicle flap and a first coupling element coupled to the first actuator, wherein the first coupling element is moveable from a locking position to a release position by moving in a translational manner relative to the fastening part, wherein it is possible for the first coupling element to rotate about a third axis of rotation relative to the fastening part in the release position.

2. The drive device according to claim 1, wherein the fastening part comprises a holding device which locks the first coupling element in the locking position in a rotationally fixed manner relative to the fastening part.

3. The drive device according to claim 2, wherein the holding device comprises at least a first holding element and a second holding element, which engage around the first coupling element in the locking position.

4. The drive device according to claim 1, wherein a mechanical securing element secures the first coupling element in the locking position against moving in a translational manner relative to the fastening part.

5. The drive device according to claim 4, wherein the mechanical securing element is released when the second actuator is actuated, by breaking a predetermined breaking point, so that the first coupling element can move in a translation manner relative to the fastening part.

6. The drive device according to claim 1, wherein the first coupling element has an inner recess for guiding the first coupling element relative to the fastening part.

7. The drive device according to claim 6, wherein the inner recess extends longitudinally so that the first coupling element is guided at least in a first portion of its translational movement.

8. The drive device according to claim 6, wherein the inner recess is an elongated hole.

9. The drive device according to claim 6, wherein a bearing element which is fixedly arranged on the fastening part passes through the inner recess.

10. The drive device according to claim 9, wherein the bearing element is arranged in the locking position at a first end of the inner recess and, in the locking position, is arranged at a second end of the inner recess opposite the first end.

11. The drive device according to claim 10, wherein the third axis of rotation is formed by the bearing element.

12. The drive device according to claim 9, wherein the third axis of rotation is formed by the bearing element.

* * * * *